US009492987B2

(12) United States Patent
Manabe et al.

(10) Patent No.: US 9,492,987 B2
(45) Date of Patent: Nov. 15, 2016

(54) POLYESTER FILM AND LAMINATE USING SAME

(75) Inventors: Isao Manabe, Otsu (JP); Teruya Tanaka, Otsu (JP); Kozo Takahashi, Otsu (JP)

(73) Assignee: Toray Industries, Inc. (JP)

( * ) Notice: Subject to any disclaimer, the term of this patent is extended or adjusted under 35 U.S.C. 154(b) by 715 days.

(21) Appl. No.: 13/997,460

(22) PCT Filed: Dec. 15, 2011

(86) PCT No.: PCT/JP2011/078990
§ 371 (c)(1),
(2), (4) Date: Jul. 22, 2013

(87) PCT Pub. No.: WO2012/086501
PCT Pub. Date: Jun. 28, 2012

(65) Prior Publication Data
US 2013/0295377 A1    Nov. 7, 2013

(30) Foreign Application Priority Data

Dec. 24, 2010  (JP) ................................. 2010-287139

(51) Int. Cl.
| | | |
|---|---|---|
| B32B 15/09 | (2006.01) | |
| B32B 15/20 | (2006.01) | |
| B32B 27/36 | (2006.01) | |
| C08G 63/16 | (2006.01) | |
| C08G 63/183 | (2006.01) | |
| B65D 1/00 | (2006.01) | |
| B65D 85/00 | (2006.01) | |
| H01M 2/02 | (2006.01) | |
| B29C 51/00 | (2006.01) | |
| B29C 55/14 | (2006.01) | |
| C08J 5/18 | (2006.01) | |
| B29K 67/00 | (2006.01) | |
| B29K 305/02 | (2006.01) | |
| B29C 51/14 | (2006.01) | |
| B29L 9/00 | (2006.01) | |

(52) U.S. Cl.
CPC .......... B32B 15/09 (2013.01); B29C 51/002 (2013.01); B29C 55/143 (2013.01); B32B 15/20 (2013.01); B32B 27/36 (2013.01); C08G 63/16 (2013.01); C08G 63/183 (2013.01); C08J 5/18 (2013.01); H01M 2/026 (2013.01); H01M 2/0275 (2013.01); B29C 51/14 (2013.01); B29K 2067/00 (2013.01); B29K 2305/02 (2013.01); B29L 2009/003 (2013.01); B32B 2250/02 (2013.01); B32B 2307/50 (2013.01); B32B 2307/734 (2013.01); B32B 2311/24 (2013.01); B32B 2367/00 (2013.01); B32B 2439/00 (2013.01); B32B 2439/80 (2013.01); B32B 2457/10 (2013.01); B32B 2457/12 (2013.01); B32B 2553/00 (2013.01); B65D 1/00 (2013.01); B65D 85/00 (2013.01); C08J 2367/02 (2013.01); H01M 2/02 (2013.01); H01M 2002/0297 (2013.01); Y10T 428/265 (2015.01); Y10T 428/31681 (2015.04); Y10T 428/31786 (2015.04)

(58) Field of Classification Search
None
See application file for complete search history.

(56) References Cited

U.S. PATENT DOCUMENTS

| | | | | |
|---|---|---|---|---|
| 4,238,443 A * | 12/1980 | Levy | ..................... | B29C 55/08 264/210.7 |
| 4,861,674 A * | 8/1989 | Inaba | ................... | G11B 5/7305 428/847.2 |
| 5,292,471 A * | 3/1994 | Ito | ........................ | B32B 27/36 156/243 |
| 6,270,869 B1 * | 8/2001 | Zeiter | ................... | B32B 15/08 206/531 |
| 7,285,334 B1 * | 10/2007 | Yamashita | .......... | H01M 2/0267 428/220 |
| 2002/0142178 A1 * | 10/2002 | Yamashita | .......... | H01M 2/0275 428/461 |
| 2003/0113616 A1 * | 6/2003 | Kasuga | ............ | H01M 10/0431 429/94 |
| 2007/0068842 A1 * | 3/2007 | Pasbrig | ................ | B32B 15/08 206/532 |
| 2009/0130276 A1 * | 5/2009 | Voisin | .................... | B32B 27/08 426/415 |
| 2009/0152155 A1 * | 6/2009 | Pasbrig | ................ | B32B 15/08 206/531 |
| 2010/0272974 A1 * | 10/2010 | Hashimoto | ............ | B32B 27/36 428/213 |

FOREIGN PATENT DOCUMENTS

| | | |
|---|---|---|
| JP | 48-61556 | 8/1973 |
| JP | 51-12860 | 1/1976 |
| JP | 53-041355 | 4/1978 |
| JP | 54-90397 | 7/1979 |
| JP | 55-20496 | 6/1980 |
| JP | 59-204617 | 11/1984 |
| JP | 03-169549 | 7/1991 |
| JP | 04-027525 | * 1/1992 |

(Continued)

OTHER PUBLICATIONS

Plastic film and resin material guidebook 2008, CTI Converting Technical Institute, Jan. 31, 2008.†

*Primary Examiner* — Vivian Chen
(74) *Attorney, Agent, or Firm* — DLA Piper LLP (US)

(57) ABSTRACT

A polyester film suitable for use in battery packages, particularly for use in deep drawn packages of lithium ion secondary batteries that includes an electrolyte (in a solid state or in a liquid state), and which is also suitable for use in packages of pharmaceutical products that have various shapes. The polyester film is characterized in that the stresses at 5% elongation (F5 values) and the stresses at 10% elongation (F10 values) of the film in the longitudinal direction and in the transverse direction at 25° C., respectively, satisfy (I) and (II):

$1.5 \geq F10_{MD}/F5_{MD} \geq 1$  (I)

$1.5 \geq F10_{TD}/F5_{TD} \geq 1$  (II).

14 Claims, No Drawings

(56) References Cited

FOREIGN PATENT DOCUMENTS

| JP | 2002-052604 | 2/2002 |
| JP | 2002-120280 | 4/2002 |
| JP | 2003-246034 | 9/2003 |
| JP | 2004-362953 | 12/2004 |
| JP | 2006-236938 | 9/2006 |
| JP | 2008-053133 | 3/2008 |

\* cited by examiner
† cited by third party

POLYESTER FILM AND LAMINATE USING SAME

TECHNICAL FIELD

This disclosure relates to polyester film, particularly to polyester film used for applications in which it is formed after being laminated with metal foil to produce articles such as exterior packages of batteries and medical packaging.

BACKGROUND

The lithium battery, also called lithium secondary battery, is a battery that contains, for example, liquid, gel-state polymer, solid polymer, and polymer electrolyte and produces electric current by virtue of movement of lithium ions and in which polymers are used as active substances of positive and negative electrodes. A lithium secondary battery consists mainly of a positive electrode collectors (aluminum, nickel)/positive electrode active substance layer (metal oxide, carbon black, metal sulfide, electrolytic liquid, polyacrylonitrile or other polymer positive electrode materials)/electrolyte layer (propylene carbonate, ethylene carbonate, dimethyl carbonate, ethylene methyl carbonate or other carbonate based electrolytic liquids, lithium salt based inorganic solid electrolyte, gel electrolyte)/negative electrode active substance layer (lithium metal, alloy, carbon, electrolytic liquid, polyacrylonitrile or other polymer negative electrode materials)/negative electrode collectors (copper, nickel, stainless steel), and housing for their packaging. Being high in high volume efficiency and weight efficiency, lithium batteries in recent years have been used as small sized, large capacity power sources in a variety of products including personal computers, mobile devices (portable telephone, PDA or the like), video cameras, electric automobiles, energy storage batteries, robots, and satellites.

Exterior packages of lithium batteries include tubular or rectangular parallelepiped metal containers produced by press working of sheet metal, and bags of multi-layered film formed of outermost layer/aluminum/sealant layer. However, metal containers have rigid outer walls that define the shapes of batteries, and hard containers have to be designed to meet requirements of the batteries to be contained, leading to the problem of limitations on the size of the container used to contain the battery. Therefore, bags formed of multi-layered film have been more favored these days. Exterior packages of lithium batteries are required to have physical properties and functions such as moisture resistance, resistance to contents (resistance to electrolytic liquid or other compounds to be contained), and formability, and film materials presently in use to meet these requirement include polyamide film (for instance, see Japanese Unexamined Patent Publication (Kokai) No. 2006-236938). However, polyamide film is not sufficiently high in resistance to moisture and contents, and the polyamide material is likely to deteriorate when coming in contact with the contents during processing, resulting in increased needs for improvements. Studies are also being made concerning the use of polyester film (for instance, see Japanese Unexamined Patent Publication (Kokai) No. 2004-362953). The proposed polyester film, however, is not necessarily high in formability and difficult to apply to deep drawing. Other investigations are also under way for developing polyester film/polyamide laminate film to solve this problem (for instance, see Japanese Unexamined Patent Publication (Kokai) No. 2008-53133). This structure, however, requires complicated production steps, and in addition, cannot be high in formability.

For medical packaging, there are increased needs for packages cladded with metal foil such as aluminum foil that can prevent degradation of the contents, and development of metal foil with improved formability that can easily fit to the shape of contents is called for.

It could therefore be helpful to provide polyester film that exhibits high formability and high strength when used as material for packages that need processing steps using a die for deep drawing.

SUMMARY

We thus provide:

(1) Polyester film having a stress at 5% elongation (F5 value) and a stress at 10% elongation (F10 value) at 25° C. in the longitudinal direction (MD) and those in the transverse direction (TD) that satisfy Formulae (I) and (II) given below:

$$1.5 \geq F10_{MD}/F5_{MD} \geq 1 \tag{I}$$

$$1.5 \geq F10_{TD}/F5_{TD} \geq 1 \tag{II}$$

(2) Polyester film as defined in (1) wherein the stress at 10% elongation (F10 value) at 25° C. in the longitudinal direction (MD) and that in the transverse direction (TD) satisfy Formulae (III) and (IV) given below:

$$F10_{MD} \geq 120 \text{ MPa} \tag{III}$$

$$F10_{TD} \geq 120 \text{ MPa} \tag{IV}$$

(3) Polyester film as defined in either (1) or (2) wherein 95 mol % or more of the glycol units are structural units derived from ethylene glycol and at the same time, 95 mol % or more of the dicarboxylic acid units are structural units derived from terephthalic acid.

(4) Polyester film as defined in any one of (1) to (3) wherein the stress at 10% elongation at 25° C. in the longitudinal direction and that in the transverse direction satisfy Formula (V) given below:

$$1.2 \geq F10_{MD}/F10_{TD} \geq 0.8 \tag{V}$$

(5) Polyester film as defined in any one of (1) to (4) wherein the degree of heat shrinkage at 200° C. is −5 to 5% both in the longitudinal direction and in the transverse direction.

(6) Polyester film as defined in any one of (1) to (5) wherein at least either of its surfaces has a dynamic friction coefficient μd of 0.3 to 0.8.

(7) Polyester film as defined in any one of (1) to (6) intended to be used for forming.

(8) Polyester film as defined in any one of (1) to (7) intended to be laminated with metal foil.

(9) Polyester film as defined in any one of (1) to (8) intended to be used for exterior packages of batteries.

(10) Polyester film as defined in any one of (1) to (8) intended to be used for medical packaging.

(11) Laminates comprising polyester film as defined in any one of (1) to (10) wherein at least either of the surfaces is laminated with aluminum foil with a thickness of 10 μm or more and 60 μm or less.

(12) Laminates as defined in (11) intended to be used for exterior packages of batteries.

(13) Laminates as defined in (11) intended to be used for medical packaging.

The polyester film has specific relationships among the stress at 5% elongation (F5 value) and stress at 10% elongation (F10 value) at 25° C. in the longitudinal direction and those in the transverse direction of the film and, accordingly, exhibits high forming followability after being laminated with aluminum foil and suitability to deep drawing, thus serving favorably to produce laminate assemblies for exterior packages of high capacity batteries and medical packaging containers of different shapes.

DETAILED DESCRIPTION

The term "polyester" used in connection with the polyester film generically refers to polymer compounds in which the major bonds in the backbone chain are ester bonds. A polyester resin can be commonly produced through condensation polymerization reaction between a dicarboxylic acid or a derivative thereof and a glycol or a derivative thereof.

It is preferable that 60 mol % or more of the glycol units constituting the polyester are accounted for by structural units derived from ethylene glycol and 60 mol % or more of the dicarboxylic acid units are accounted for by structural units derived terephthalic acid, from the viewpoint of forming followability, heat, dimensional stability, electrolyte resistance, and cost of products laminated with aluminum foil. A dicarboxylic acid unit (structural unit) and a diol unit (structural unit) mean divalent organic groups after being deprived of those portions to be removed by condensation polymerization and represented by the following Formulae:

Dicarboxylic acid unit (structural unit): —CO—R—CO—

Diol unit (structural unit): —O—R'—O— wherein R and R' each denote a divalent organic group, and R and R' may be either identical to or different from each other. It should be noted that units (structural units) of tri- or higher-valent carboxylic acids, alcohols, and derivatives thereof such as trimellitic acid unit and glycerin unit are also defined similarly.

Glycols and derivatives thereof that can produce polyester include, in addition to ethylene glycol, aliphatic dihydroxy compounds such as 1,2-propanediol, 1,3-propanediol, 1,3-butanediol, 1,4-butanediol, 1,5-pentanediol, and 1,6-hexanediol, neopentyl glycol; polyoxyalkylene glycols such as diethylene glycol, polyethylene glycol, polypropylene glycol, and polytetramethylene glycol; alicyclic dihydroxy compounds such as 1,4-cyclohexanedimethanol, and spiroglycol; aromatic dihydroxy compounds such as bisphenol A, and bisphenol S, and derivatives thereof.

Dicarboxylic acid and derivatives thereof that can produce polyester include, in addition to terephthalic acid, aromatic dicarboxylic acids such as isophthalic acid, phthalic acid, 2,6-naphthalene dicarboxylic acid, diphenyl dicarboxylic acid, diphenyl sulfone dicarboxylic acid, diphenoxyethane dicarboxylic acid, and 5-sodiumsulfone dicarboxylic acid; aliphatic dicarboxylic acids such as oxalic acid, succinic acid, adipic acid, sebacic acid, dimer acid, maleic acid, and fumaric acid; alicyclic dicarboxylic acids such as 1,4-cyclohexanedicarboxylic acid; hydroxycarboxylic acids such as parahydroxybenzoic acid; and derivatives thereof. Derivatives of dicarboxylic acid include, for example, dimethyl terephthalate, diethyl terephthalate, 2-hydroxyethyl methyl terephthalate, 2,6-dimethyl naphthalene dicarboxylate, dimethyl isophthalate, dimethyl adipate, diethyl maleate, dimethyl dimerate, and other esterification products.

From the viewpoint of forming followability after being laminated with aluminum foil, it is necessary for the polyester film to have a stress at 5% elongation (F5 value) and a stress at 10% elongation (F10 value) at 25° C. in the longitudinal direction and those in the transverse direction that satisfy Formulae (I) and (II) given below:

$$1.5 \geq F10_{MD}/F5_{MD} \geq 1 \quad (I)$$

$$1.5 \geq F10_{TD}/F5_{TD} \geq 1 \quad (II)$$

wherein $F10_{MD}$, $F5_{MD}$, $F10_{TD}$, and $F5_{TD}$ respectively denote the stress at 10% elongation and stress at 5% elongation in the longitudinal direction and the stress at 10% elongation and stress at 5% elongation in the transverse direction, represented in MPa, as determined from tensile test for rectangular film samples with a test length of 50 mm performed under the conditions of 25° C., 63% Rh, and a strain speed of 300 mm/min. With respect to the longitudinal direction and transverse direction of a film, the refractive index of the film was measured in an arbitrarily selected direction (0°) and directions at 15°, 30°, 45°, 60°, 75°, 90°, 105°, 120°, 135°, 150°, and 165° from the former direction, and the direction with the highest refractive index was defined as the transverse direction while the direction perpendicular to the transverse direction was defined as the longitudinal direction. The above definitions of the longitudinal direction and the transverse direction also apply to other properties.

Satisfying Formulae (I) and (II) means that the stress does not decrease largely at an initial stage of deformation, that is, it does not show a definite yield point. For a polyester film to exhibit such properties, it is important for its molecular chains to be oriented highly and uniformly, and the formation of such a structure allows the film to be stretched without ductile deformation or nonuniform deformation. Thus, the film will show no definite yield point.

We found that the use a polyester film that does not show a definite yield point at an initial stage of deformation can provide a product with a dramatically improved forming followability after being laminated with metal foil. This mechanism has not been clarified yet in detail, but we believe as described below. Aluminum foil is inherently a material that is highly resistant to deformation and, when it is deformed together with a film, it exhibits a definite yield point during the deformation of the film. If there occurs an inflection point where a large change in stress takes place, therefore, the aluminum foil will be unable to absorb the change in stress and likely to break. It is inferred accordingly that the use of a film that satisfies Formulae (I) and (II) and has no definite yield point at an initial stage of deformation allows aluminum foil to deform in coordination with the deformation of the film.

The film after being laminated with aluminum foil will be poor in forming followability if $F10_{MD}/F5_{MD}$ and $F10_{TD}/F5_{TD}$ are less than one whereas if $F10_{MD}/F5_{MD}$ and $F10_{TD}/F5_{TD}$ are more than 1.5, the degree of orientation of molecular chains will be extremely high and only small impurities or defects will cause breakage during film production, leading to extremely low film-forming performance.

From the viewpoint of forming followability after being laminated with aluminum foil as well as film-forming performance, it is preferable for the polyester film to have a stress at 5% elongation (F5 value) and a stress at 10% elongation (F10 value) at 25° C. in the longitudinal direction and those in the transverse direction that satisfy Formulae (I) and (II) given below:

$$1.2 \geq F10_{MD}/F5_{MD} \geq 1.05 \quad (I)'$$

$$1.2 \geq F10_{TD}/F5_{TD} \geq 1.05 \quad (II)'$$

$$1.2 \geq F10_{MD}/F5_{MD} \geq 1.1 \quad (I)''$$

$$1.2 \geq F10_{TD}/F5_{TD} \geq 1.1 \quad (II)''.$$

Polyester films generally used in industries show a yield behavior in which the stress largely decreases at an initial stage of deformation. Thus, general polyethylene terephthalate films, for instance, have ratios $F10_{MD}/F5_{MD}$ and $F10_{TD}/F5_{TD}$ of 0.95 to 0.98, which tend to further decrease if copolymers are contained. Numerical comparison may suggest that polyester films satisfying Formulae (I) and (II) are not significantly different in properties from common polyethylene terephthalate films, but actual structures and properties of a film largely differ depending on whether it has a definite yield behavior.

As a method for the polyester film to Formulae (I) and (II), it is preferable that 90 mol % or more, more preferably 95 mol % or more, of the glycol units be structural units derived from ethylene glycol. Furthermore, it is preferable that 90 mol % or more, more preferably 95 mol % or more, of the dicarboxylic acid units be either structural units derived from terephthalic acid or structural units derived from 2,6-naphthalene dicarboxylic acid. From the viewpoint of productivity and cost, it is preferable that 90 mol % or more, more preferably 95 mol % or more, of the dicarboxylic acid units be structural units derived from terephthalic acid. It is the most preferable that 95 mol % or more of the glycol units be structural units derived from ethylene glycol and at the same time, 95 mol % or more of the dicarboxylic acid units be structural units derived from terephthalic acid. Constitutions as given above are preferable because they will lead to a nearly homopolymeric polyethylene terephthalate, thereby decreasing components that impede uniform orientation of molecular chains.

In producing a film, an unstretched sheet is produced by discharging and extruding melts from a T-die onto a cooling drum to form a sheet, and usable methods for this step include applying static electricity using a wire-like electrode, tape-like electrode, or needle-like electrode to bring the sheet into close contact with a cooling drum, using a casting technique in which water film is provided between the cooling drum and the extruded polymer sheet, or combining a plurality of these and similar methods to bring the sheet-like polymer material into close contact with a cooling drum so that it is cooled and solidified to provide an unstretched film.

For the polyester film to satisfy Formulae (I) and (II), it is preferable to maintain the cooling drum at a low temperature during this casting step. Specifically, the cast temperature is controlled preferably at 0 to 10° C., more preferably 0 to 5° C. From the viewpoint of contact with the sheet extruded from the die as well as its planarity, the surface roughness (maximum height) of the cooling drum is preferably 0.2 μm or less, and its surface is preferably plated with hard chromium. From the viewpoint of cooling performance and productivity, furthermore, the speed of the sheet passing on the cooling drum is preferably 5 to 30 m/min and the length of contact between the sheet and cooling drum is preferably 1 to 3 m. When adopting the method of applying static electricity to achieve close contact with the cooling drum, the voltage to be used is preferably 10 kV to 20 kV, more preferably 12 kV to 18 kV. The distance between the orifice lip and cooling drum is preferably adjusted to 30 mm to 50 mm. Meeting the aforementioned conditions in the casting step prevents orderly structures from being formed in the unstretched film and, accordingly, molecular chains will be oriented more highly and uniformly in the stretching step to be carried out following the casting step, making it possible to satisfy Formulae (I) and (II).

To obtain the polyester film, the unstretched film resulting from the casting step is subjected to either a sequential biaxial stretching step such as stretching in the longitudinal direction followed by stretching in the transverse direction, or stretching in the transverse direction followed by stretching in the longitudinal direction, or a simultaneous biaxial stretching step in which the film is stretched substantially simultaneously in the longitudinal direction and in the transverse direction, and in these stretching steps the draw ratio is preferably 3.5 to 4.5, more preferably 3.6 to 4.2, and particularly preferably 3.7 to 4, in each direction. The stretching temperature is preferably as low as possible unless uneven stretching takes place. If, for instance, a sequential biaxial stretching step is carried out by stretching in the longitudinal direction followed by stretching in the transverse direction, and the preheat temperature and stretching temperature in the longitudinal direction are preferably 50 to 60° C. and 80 to 90° C., respectively, while the preheat temperature and stretching temperature in the transverse direction are preferably 70 to 80° C. and 90 to 100° C., respectively. Stretching may be carried out a plurality of times in each direction.

It is preferable from the viewpoint of productivity that for the polyester film, sequential biaxial stretching be carried out in this stretching step by stretching in the longitudinal direction by virtue of the difference in speed between the heating rollers used, followed by stretching in the transverse direction using a tenter type transverse stretching longitudinal. To satisfy Formulae (I) and (II), stretching in the longitudinal direction is preferably carried out under the conditions of a low preheat temperature of 50 to 60° C. and a stretching temperature controlled at 80 to 90° C., and it is preferable to quench the film using a cooling roller after stretching. In this step, the cooling roller is preferably maintained at a low temperature, specifically at 0 to 15° C., more preferably 5 to 10° C. To further increase the cooling efficiency, it is preferable to use 6 or more, preferably 8 or more, cooling rollers having a roller diameter of 150 mm or more, preferably 170 mm or more. From the viewpoint of cooling efficiently, the surface roughness (maximum height) of the cooling rollers is preferably 0.4 μm or less, and their surfaces are preferably plated with hard chromium. From the viewpoint of cooling performance and productivity, furthermore, the speed of the sheet passing on the cooling rollers after being stretched in the longitudinal direction is preferably 20 to 150 m/min and the length of contact between the sheet and cooling rollers is preferably 3 to 5 m. Nip rollers may be used here. Quick quenching of the sheet by the above technique after stretching in the longitudinal direction can suppress formation of orderly structures in amorphous portions where oriented crystallization has not taken place and, therefore, stretching in the transverse direction after stretching in the longitudinal direction allows molecular chains to be oriented highly and uniformly to satisfy Formulae (I) and (II).

For the polyester film to satisfy Formulae (I) and (II), stretching in the transverse direction is carried out preferably at a low preheat temperature of 70 to 80° C. and stretching temperature of 90 to 100° C. To promote molecular chains to be oriented uniformly, the preheating step and stretching step in the tenter are preferably divided into an increased number of sections, followed by controlling their temperatures uniformly. Specifically, it is preferable that the preheat step be divided into 3 or more sections while the stretching step be also divided into 3 or more sections and that each of the sections be provided with shielding plates and fans for protection against hot air to maintain temperature control for each section. It is also preferable that each section have a length of 4,000 mm or less. The use of a tenter as described above for stretching in the transverse direction allows molecular chains to be oriented highly and uniformly to satisfy Formulae (I) and (II).

Furthermore, the polyester film is preferably subjected to heat treatment after stretching in the transverse direction. Heat treatment can be carried out by a conventional, generally known method such as the use of an oven and heated rollers. The heat treatment is preferably performed at 180° C. to 240° C. An appropriate heat treatment time may be set arbitrarily unless characteristics deteriorate, and it is preferably 10 to 60 seconds, more preferably 15 to 30 seconds. In addition, the heat treatment may be performed while relaxing the film in the longitudinal direction and/or in the transverse direction.

The stress at 10% elongation (F10 value) at 25° C. in the longitudinal direction and that in the transverse direction preferably satisfy Formulae (III) and (IV) given below to further improve the forming followability after lamination with aluminum foil:

$$F10_{MD} \geq 120 \text{ MPa} \tag{III}$$

$$F10_{TD} \geq 120 \text{ MPa} \tag{IV}$$

Satisfying Formulae (III) and (IV) means that the strength of the film is very high at an initial stage of deformation. For a polyester film to show such properties, it is particularly important that the degree of tension of amorphous chains be very high, and increasing the degree of this amorphous tension acts to suppress the shift from elastic deformation to plastic deformation during film formation, resulting in a film that shows very high strength. Necking takes place as the film starts plastic deformation and, accordingly, fine pinholes (hereinafter abbreviated as PHs) may be produced when a film laminated with aluminum foil is formed, even if the aluminum foil can deform in a coordinated manner. Thus, it is important to satisfy Formulae (III) and (IV). Satisfying Formulae (III) and (IV), furthermore, is highly preferable because it ensures increased impact resistance of the film when used in laminate assemblies for exterior packages of batteries or laminate assemblies for medical packaging containers.

Stress at 10% elongation (F10 value) at 25° C. in the longitudinal direction and that in the transverse direction preferably satisfy Formulae (III)' and (IV)' given below to suppress the generation of PHs after forming a product laminated with aluminum foil:

$$F10_{MD} \geq 125 \text{ MPa} \tag{III'}$$

$$F10_{TD} \geq 125 \text{ MPa} \tag{IV'}$$

Preferable methods to satisfy Formulae (III) and (IV) include methods for satisfying Formulae (I) and (II). To increase the degree of amorphous tension, it is particularly important to prevent orderly structures, such as crystal precursors, from being formed in amorphous portions before the step of stretching in the transverse direction, and the casting temperature is controlled preferably at 0 to 10° C., more preferably 0 to 5° C. Furthermore, it is preferable to quench the film using cooling rollers after stretching in the longitudinal direction, and the cooling rollers in this step is preferably maintained at a temperature of 0 to 15° C., more preferably 5 to 10° C. It is preferable to use 6 or more, preferably 8 or more, cooling rollers with a roller diameter of 150 mm or more, preferably 170 mm or more. The draw ratio for stretching the film in the longitudinal direction and transverse direction is preferably 3.6 to 4.2, particularly preferably 3.7 to 4 in each direction. Performing the above techniques simultaneously serves to satisfy Formulae (III) and (IV). The polyester film produced by these techniques has a higher degree of amorphous tension than that of generally known highly-stretched, highly-oriented polyester films and accordingly can satisfy Formulae (III) and (IV).

The stress at 10% elongation (F10 value) at 25° C. in the longitudinal direction and that in the transverse direction preferably satisfy Formulae (III) and (IV) given below to further improve forming followability after lamination with aluminum for instance, but the values of $F10_{MD}$ and $F10_{TD}$ are preferably 200 MPa or less from the viewpoint of film formation performance.

They are preferably 170 MPa or less from the viewpoint of cost, and most preferably 150 MPa or less from the viewpoint of productivity.

The stress at 10% elongation at 25° C. in the longitudinal direction and that in the transverse direction preferably satisfy Formula (V) given below from the viewpoint of uniform-shape formability:

$$1.2 \geq F10_{MD}/F10_{TD} \geq 0.8 \tag{V}$$

Satisfying Formulae (V) means that the strength of the film in the longitudinal direction and that in the transverse direction are in good balance. A uniform shape can be achieved when forming the film, if the strength of the film in the longitudinal direction and that in the transverse direction are in good balance. A preferred method of satisfying Formula (V) is to decrease the difference between the draw ratio for longitudinal direction and that for the transverse direction. The absolute value of the difference between the draw ratio for longitudinal direction and that for the transverse direction (|draw ratio for the longitudinal direction−draw ratio for the transverse direction|) is preferably 0 or more and 0.2 or less, more preferably 0 or more and 0.1 or less.

It is preferable that the polyester film have a degree of heat shrinkage at 200° C. of −5 to 5% in both the longitudinal direction and the transverse direction from the viewpoint of heat resistance. When the polyester film is used as laminate assemblies for exterior packages of high capacity batteries or laminate assemblies for medical packaging containers, it is preferably used as laminate assemblies having a structure of polyester film/aluminum foil/sealant film, but it needs heat resistance if the sealant film portion is to be heated for heat sealing or battery products produced are to be used in a high temperature environment. If the degree of heat shrinkage at 200° C. is −5 to 5% both in the longitudinal direction and in the transverse direction, the polyester film will undergo little shrinkage during heat sealing and accordingly suffer from little curling when used as a laminate assembly. When the film is exposed to a high temperature environment after being incorporated in a battery product, peeling between the polyester film and aluminum foil will not be caused by shrinkage of the film. The degree of heat shrinkage at 200° C. is more preferably −1 to 4%, most preferably 0 to 3%, both in the longitudinal direction and in the transverse direction.

For example, a method usable for adjusting the degree of heat shrinkage at 200° C. of the polyester film to −5 to 5% both in the longitudinal direction and in the transverse direction is to control the conditions for heat treatment of the film after biaxial stretching. From the viewpoint of heat resistance and film quality, the temperature for heat treatment after biaxial stretching is preferably 200° C. to 240° C., more preferably 210° C. to 230° C. The optimum heat treatment temperature for polyester film can be determined from a minor endothermic peak attributable to heat history that appears on a differential scanning calorimetry (DSC) curve observed by DSC at a heating rate of 2 0° C./min in a nitrogen atmosphere. The heat treatment time is preferably 10 to 60 seconds, more preferably 15 to 30 seconds. In addition, the heat treatment may be performed while relaxing the film in the longitudinal direction and/or in the transverse direction. It is preferable to relax the film in the longitudinal direction and/or in the transverse direction during heat treatment, because the degree of heat shrinkage can be decreased. The degree of relaxation during is preferably 3% or more, but from the viewpoint of dimensional stability and productivity, it is more preferably 3% or more and 10% or less, most preferably 3% or more and 5% or less.

Performing heat treatment in two or more stages is highly preferable. The degree of heat shrinkage can be further decreased by first performing heat treatment at a high temperature of 200° C. to 240° C. followed by heat treatment at a temperature lower than that for the former heat treatment while relaxing the film in the longitudinal direction and/or in the transverse direction. The temperature for the second stage heat treatment is preferably 120° C. to 180° C., more preferably 150° C. to 180° C.

It is necessary for the polyester film to satisfy Formulae (I) and (II). Molecular chains are oriented highly and uniformly, and accordingly, the degree of heat shrinkage tends to be higher than that of common biaxially stretched polyester film. Therefore, in addition to the aforementioned method of decreasing the degree of heat shrinkage of common biaxially orientated polyester film, another preferred method is to perform heat treatment at a high temperature after relaxing once at a temperature equivalent to the stretching temperature between biaxial stretching and heat treatment. There are no specific limitations on the relaxation degree unless the molecular chain orientation is decreased, but it is preferably 0.5% to 3%, more preferably 1% to 2%.

It is preferable that the polyester film have a dynamic friction coefficient μd of 0.3 to 0.8 from the viewpoint of formability. When the polyester film is used to produce laminate assemblies for exterior packages of batteries or medical packaging containers, they are formed by press forming using a press die consisting of a pair of mating dies, and a dynamic friction coefficient μd of 0.3 to 0.8 ensures good slip with the press die and, in turn, smooth forming. It is more preferably 0.3 to 0.7, and most preferably 0.3 to 0.6. The dynamic friction coefficient refers to that between either surface of a film and the other surface thereof.

For the polyester film, a method usable to control the dynamic friction coefficient μd at 0.3 to 0.8 is to add particles to the film. There are no specific limitations on the particles to be added, and they may be internal particles, inorganic particles, or organic particles with an average particle diameter 0.01 to 5 μm and preferably account for 0.01 to 1 mass %. The average particle diameter of the particles to be used is more preferably 0.05 to 3 μm and still more preferably 0.1 to 2 μm.

To separate out internal particles, adoptable techniques include, for instance, those described in Japanese Unexamined patent Publication (Kokai) No. SHO 48-61556, Japanese Unexamined patent Publication (Kokai) No. SHO 51-12860, Japanese Unexamined patent Publication (Kokai) No. SHO 53-41355, or Japanese Unexamined patent Publication (Kokai) No. SHO 54-90397. In addition, they may be combined with other particles such as those described in Japanese Examined patent Publication (Kokoku) No. SHO 55-20496 or Japanese Unexamined patent Publication (Kokai) No. SHO 59-204617. Usable inorganic particles include, for instance, those of wet and dry silica, colloidal silica, aluminum silicate, titanium oxide, calcium carbonate, calcium phosphate, barium sulfate, aluminum oxide, mica, kaolin, and clay. Usable organic particles include those containing styrene, silicone, various acrylic acids, methacrylic acids, polyesters, or divinyl compounds as constituents. In particular, it is preferable to use inorganic particles such as of wet and dry silica and alumina or particles containing styrene, silicone, acrylic acid, methacrylic acid, polyester, or divinylbenzene as constituents. Furthermore, these internal particles, inorganic particles, and organic particles may be used as a combination of two or more thereof.

From the viewpoint of contact with aluminum foil, it is preferable for the polyester film to have an adhesive layer laminated on at least either of its surfaces. This can ensure good contact and improved adhesive strength. There are no specific limitations on the method to be used to form a coating layer, and methods of forming an adhesive layer include coating of the film surface with resin (composite melt extruding, hot melt coating, in-line or off-line coating from a non-water solvent, water-soluble and/or water-dispersible resin and the like) and surface lamination with a layer containing similar constituents or a blend thereof. In particular, the use of an in-line coating technique in which a coating material is spread over either surface of a film having undergone oriented crystallization incompletely, followed by stretching the film at least in one direction and heat-treating it to complete the oriented crystallization is preferable for uniform film formation and industrial manufacturing. When forming an adhesive layer by a coating technique, there are no specific limitations on the resin to be used for imparting adhesiveness, and usable ones include, for instance, acrylic resin, urethane based resin, polyester based resin, olefin based resin, fluorine based resin, vinyl based resin, chlorine based resin, styrene based resin, various graft resins, epoxy based resin, and silicone based resin, and mixtures of these resins may also be used. From the viewpoint of contact, it is preferable to use a polyester based resin, acrylic resin, or urethane based resin. In the case of using a polyester resin in the form of an aqueous coating liquid, a water-soluble or water-dispersible polyester resin is commonly used, and such a water-soluble or water-dispersible polyester resin is produced preferably by copolymerization with a compound containing carboxylate group or a compound containing sulfonate group. When an acrylic resin is used as an aqueous coating liquid, it has to be dissolved or dispersed in water, and a surface active agent (such as, but not limited to, polyether based compound) may be used as emulsifier in some cases.

Various crosslinking agents may be combined with the resin constituting an adhesive layer to further improve the adhesiveness. Resins generally used as crosslinking agents include melamine based, epoxy based, or oxazoline based resins.

Particles to be added to an adhesive layer include inorganic based particles and organic based particles, of which inorganic particles are more preferable because they can improve the lubricity and blocking resistance. Usable inorganic particles include those of silica, alumina, kaolin, talc, mica, calcium carbonate, and titanium.

The polyester film preferably has a thickness of 12 μm or more and 50 μm or less, more preferably 16 μm or more and 38 μm or less, and most preferably 20 μm or more and 30 μm or less, from the viewpoint of forming followability after being laminated with aluminum foil, suppression of pinhole formation, and strength.

The polyester film is used favorably in the form of a laminate in which at least either of its surfaces is laminated with metal foil with a thickness of 10 μm or more and 100 μm or less. The thickness of the metal foil is more preferably 10 μm or more and 60 μm or less. In particular, aluminum foil with a thickness of 10 μm or more and 60 μm or less is used favorably from the viewpoint of gas barrier property, formability, and cost. Usable materials for the aluminum foil include, for instance, pure aluminum and aluminum-iron based alloy. An aluminum foil thickness of 10 μm or more and 60 μm or less is preferable because it can allow the film to have both forming followability and barrier property against oxygen and moisture. The thickness is more preferably 20 μm or more and 50 μm or less and most preferably 25 μm or more and 45 μm or less. To produce a laminate with improved adhesiveness, the aluminum foil may be provided with an undercoat containing a silane coupling agent, titanium coupling agent, etc., or may be subjected to pretreatment such as corona discharge treatment. If the polyester film is provided with an adhesive layer, it is preferable that the adhesive layer surface be the surface to be laminated with aluminum foil.

There are no specific limitations on the method to be used for laminating the polyester film with aluminum foil, but dry lamination by an adhesive is used favorably from the viewpoint of good contact formation. The adhesive to be used may be either a thermosetting one or a thermoplastic one, but the use of a thermosetting one is preferable. Usable adhesives include, for instance, polyurethane based resin, polyester based resin, polyvinyl chloride based resin, styrene-butadiene copolymer, acrylonitrile-butadiene copolymer, methyl methacrylate-butadiene copolymer, chloroprene, polybutadiene, other rubbery resins, polyacrylate based resin, polyvinylidene chloride based resin, polybutadiene, carboxyl-modified products of these resins, epoxy based resin, cellulose based derivatives, ethylene-vinyl acetate based copolymer, polyethylene oxide, acrylic based resin, and lignin derivatives. Adhesives formed of polyurethane based resin or polyester based resin are preferable from the viewpoint of contact between polyester film and polyolefin film.

For the laminates, it is preferable that the aluminum foil be further laminated with a sealant film. For the sealant film, an appropriate material may be selected from the group consisting of ethylene based resins such as low density polyethylene, medium density polyethylene, high density polyethylene, linear low density polyethylene, and ethylene-butene copolymers, and propylene based resins such as homopolypropylene, ethylene-propylene copolymers, and ethylene-propylene-butene copolymers, which may be used singly or as a mixture.

The techniques of providing a modified polyolefin resin between the aluminum foil and the sealant film with the aim of improving the contact between the aluminum foil and the sealant film. A modified polyolefin resin as referred to above is a polyolefin resin in which one or more polar groups are contained in a molecule of the polyolefin resin at least at an end, both ends, or internal position. A polar group as referred to above is a functional group containing an atom with high electronegativity such as oxygen atom and nitrogen atom, or more specifically, it contains a functional group such as amide group, carboxyl group, and hydroxyl group, or a substituent group containing such a functional group.

The modified polyolefin resin is preferably a polyolefin resin modified with unsaturated dicarboxylic or modified by oxidative decomposition of the resin, of which a modified polyolefin resin modified with unsaturated dicarboxylic acid is more preferable. Specifically, from the viewpoint of interlayer contact with a polyester layer (A-layer), the modified polyolefin resin is preferably a polyolefin resin such as low density polyethylene, medium density polyethylene, high density polyethylene, linear low density polyethylene, ethylene-α-olefin copolymer polymerized with a metallocene catalyst, polypropylene, ethylene-propylene copolymer, methyl pentene polymer, and a random or block copolymer of α-olefin monomers, that are modified with an unsaturated dicarboxylic acid such as acrylic acid, methacrylic acid, maleic anhydride, and fumaric acid. It is preferable that the unsaturated dicarboxylic acid be maleic anhydride, and thus a modified polyolefin resin produced by modifying a polyolefin resin with maleic anhydride is particularly preferable.

Such polyolefin resins modified with unsaturated dicarboxylic acid include, for instance, "Youmex" supplied by Sanyo Chemical Industries Ltd., "Admer" supplied by Mitsui Chemicals, Inc., "Modic" supplied by Mitsubishi Chemical Corporation, "Orevac" and "Lotader" supplied by Arkema K.K., "Toyotack" H-1000P supplied by Toyo Kasei Kogyo Co., Ltd., and other various products. In addition, modified polyolefin resins modified by oxidative decomposition of the resins include "Biscole" and "Sanwax" supplied by Sanyo Chemical Industries Ltd.

The polyester film is preferably used for forming. The polyester film has specific relationships among the stress at 5% elongation (F5 value) and stress at 10% elongation (F10 value) at 25° C. in the longitudinal direction and those in the transverse direction of the film and, accordingly, exhibits no definite yield point. When applied to products produced by forming after lamination with metal foil such as aluminum foil, in particular, the film can manufacture products of various shapes by virtue of its high forming followability.

The polyester film is used favorably to manufacture exterior packages of batteries with increased capacity because it can be deep-drawn after being laminated with metal foil such as aluminum foil as described above. To maintain required battery performance, materials for exterior packages of batteries are required to have vapor barrier property to prevent penetration of water, electrolyte resistance to prevent swelling with electrolytes, and suitability to deep drawing for producing packages of high capacity butteries. For a film to achieve good water vapor barrier property, it is preferable that the film contain metal foil, and therefore, the film is preferably laminated with aluminum foil with a thickness of 10 μm or more and 60 μm or less from the viewpoint of gas barrier property, formability, and cost. The polyester film can be deep-drawn easily after being laminated with aluminum foil, and accordingly, excellent laminates and laminate assemblies for exterior packages of batteries can be obtained when it is applied to exterior packages of batteries.

The polyester film can also be used favorably for medical packaging applications. Medical packaging containers are required to have gas barrier property and water vapor barrier property to prevent the degradation of the contents, and also required to have printability to meet specifications requiring printing. Furthermore, there are increased needs for films that can be deep-drawn to provide containers for contents of various shapes. For a film to achieve good gas barrier property and water vapor barrier property, it is preferable that the film contain metal foil and, therefore, the film is preferably laminated with aluminum foil with a thickness of 10 μm or more and 60 μm or less from the viewpoint of gas barrier property, formability, and cost. The polyester film can be deep-drawn easily after being laminated with aluminum foil and, accordingly, excellent laminates and laminate assemblies for medical packaging containers can be obtained when it is applied to medical packaging.

EXAMPLES

Polyester films were produced and evaluated by methods as described below. Forming followability after lamination with aluminum foil is an important characteristic for the polyester film to serve favorably to manufacture exterior packages of batteries that can be used for batteries with increased capacity, and medical packaging containers that can be used for contents of various shapes.
(1) Constituents of Polyester Film
Polyester resin and film specimens were dissolved in hexafluoroisopropanol (HFIP), and the contents of various monomer residues and by-product diethylene glycol were determined using $^1$H-NMR and $^{13}$C-NMR.
(2) Thickness of Film
To measure the overall film thickness, specimens of 200 mm×300 mm were cut out of the film, and the thickness of each specimen was measured at five arbitrarily selected positions using a dial gauge, and the measurements were averaged.
(3) Refractive Index
Using sodium D-line (wavelength 589 nm) as light source, the refractive index of a film was measured with an Abbe refractometer.
The refractive index of a film was measured in an arbitrarily selected direction (0°) and directions at 15°, 30°, 45°, 60°, 75°, 90°, 105°, 120°, 135°, 150°, and 165° from the former direction, and the direction with the highest refractive index was defined as the transverse direction while the direction perpendicular to the transverse direction was defined as the longitudinal direction.
(4) $F10_{MD}$, $F5_M$, $F10_{TD}$, $F5_{TD}$, $F10_{MD}/F5_{MD}$, and $F10_{TD}/F5_{TD}$
A rectangular specimen with a length of 150 mm and a width of 10 mm was cut out of a film under the conditions of 25° C. and 63% Rh. Using a tensile tester (Tensilon tester UCT-100, supplied by Orientec Co., Ltd.), tensile test of a film was carried out in its longitudinal direction and transverse direction under the conditions of a crosshead speed of 300 mm/min, width of 10 mm, and specimen length of 50 mm to determine the stress at 10% elongation, $F10_{MD}$, and stress at 5% elongation, $F5_{MD}$, in the longitudinal direction and the stress at 10% elongation, $F10_{TD}$, and stress at 5% elongation, $F5_{TD}$, in the transverse direction. Five measurements were made for each specimen and their average was used.
(5) Degree of Heat Shrinkage at 200° C.
A rectangular specimen with a length of 150 mm and a width of 10 mm was cut out of a film. Gauge marks were made on the specimen at intervals of 100 mm and heat treated for 10 minutes, with a 3 g weight hung from it, in a hot air oven heated at 200° C. After the heat treatment, the intervals of the gauge marks were measured, and the differences in the gauge mark intervals measured before and after the heating were applied to the following formula to calculate the degree of heat shrinkage. For each film, five specimens were taken for the longitudinal and transverse directions, and evaluation was carried out based on the average of the measurements.

Degree of heat shrinkage (%)={(gauge mark interval before heat treatment)−(gauge mark interval after heat treatment)}/(gauge mark interval before heat treatment)×100

(6) Dynamic Friction Coefficient μd
The dynamic friction coefficient (μd) was measured using a slip tester under the following conditions according to JIS K7125 (1999). Measurements were made with either side of a film maintained in contact with the opposite side thereto.
  Specimen size: 75 mm (width)×100 mm (length)
  Slip speed: 150 mm/min
  Load: 1.96 N
(7) Film-Forming Property
Stability in film production observed when a film is produced in each Example.
  ○: Film of 1,000 m or more produced without any breakage
  Δ: Breakage taking place at 600 m or more and less than 1,000 m
  x: Breakage taking place at less than 600 m
(8) Forming Followability of Laminate Assemblies
The polyester film was dry-laminated by an ordinary method with aluminum foil (with a thickness of 40 μm) using an urethane based adhesive (AD-502 and CAT10L supplied by Toyo-Morton, Ltd., and ethyl acetate mixed at 15:1.5:25 (mass ratio)) to prepare a laminate. On top of the aluminum foil, a two-layered co-extruded film produced by co-extruding a maleic acid modified polypropylene resin and polypropylene (maleic acid modified polypropylene resin layer 15 μm, and polypropylene resin layer 30 μm), used as sealant, was pressure-bonded under heat using a laminator (120° C., 0.3 MPa, 2 m/min) such that the maleic acid modified polypropylene resin layer faced the aluminum foil to provide an assembly. A specimen of 200 mm×200 mm was cut out of the resulting laminate assembly, and press-formed (pressure 0.1 MPa) using a form with a clearance of 0.5 mm between a rectangular male die of 150 mm×150 mm (R: 2 mm) and a female die (R: 2 mm), with the assembly being placed on the female die such that the sealant faced the male die, and evaluation was conducted according to the following criteria:
  ◎: formability over 10 mm or more (free of damage)
  ○: damage taking place at 7 m or more and less than 10 mm
  Δ: damage taking place at 5 mm or more and less than 7 mm
  x: damage taking place at less than 5 mm.
(9) Pinholes Formed after Forming into Assembly
At the height where forming was carried out successfully without damage in the forming followability evaluation under (8), forming test was conducted 30 times and each formed assembly was observed visually in a darkroom using a transmitted light testing instrument supplied by Funatech Co., Ltd., to determine if it contained pinholes. 30 formed assemblies were examined, and the number of those containing pinholes was counted.
(10) Curling Property of Assembly
Assemblies were prepared as in (8), pressure-bonded under heat using a laminator (200° C., 0.3 MPa, 2 m/min), placed on a horizontal table, and evaluated in curling property according to the following criteria:
- ⊚: Curl height is less than 1 cm.
- ○: Curl height is 1 cm or more and less than 2 cm.
- Δ: Curl height is 2 cm or more and less than 3 cm.
- x: Curl height is 3 cm or more.

Described below are specific examples of production of our polyester film.

Production of Polyester

Polyester resins used for film production were prepared as follows.

Polyester A

First, 0.04 part by mass of manganese acetate was added to a mixture of 100 parts by mass of dimethyl terephthalate and 70 parts by mass of ethylene glycol, and heated gradually, and finally ester interchange reaction was conducted while distilling out methanol at 220° C. Then, 0.025 part by mass of an 85% aqueous phosphoric acid solution and 0.02 part by mass of germanium dioxide were added, and condensation polymerization reaction was performed at 290° C. under a reduced pressure of 1 hPa to provide a polyethylene terephthalate resin copolymerized with 1 mol % by-product diethylene glycol and having an intrinsic viscosity of 0.65.

Polyester B

First, 0.09 part by mass of magnesium acetate and 0.03 part by mass of antimony trioxide was added to a mixture of 90 parts by mass of dimethyl terephthalate, 10 parts by mass of dimethyl isophthalate, and 70 parts by mass of ethylene glycol, and heated gradually, and finally ester interchange reaction was conducted while distilling out methanol at 220° C. Then, after adding 0.020 part by mass of 85% aqueous phosphoric acid solution, the product of the ester interchange reaction was transferred to a condensation polymerization reaction vessel. The pressure in the reaction system was gradually reduced while heating the interior of the polymerization vessel, and condensation polymerization reaction was performed at 287° C. under a reduced pressure of 1 hPa to provide a polyethylene terephthalate resin copolymerized with 10 mol % isophthalic acid and also copolymerized with 1 mol % by-product diethylene glycol and having an intrinsic viscosity of 0.7.

Particle Master

A polyethylene terephthalate particle master (intrinsic viscosity 0.65) produced by adding agglomerated silica particles with an average particle diameter of 2.2 μm to polyester A to a particle concentration of 2 mass %.

Coating Material A
- acrylic resin consisting of the following comonomers: methyl methacrylate/ethyl acrylate/acrylic acid/N-methylol acrylamide with a ratio of 63:35:1:1 wt %:3.00 mass % melamine crosslinking agent: 0.75 mass %
- colloidal silica particles (average particle diameter: 80 nm): 0.15 mass %
- hexanol: 0.26 mass %
- butyl cellosolve: 0.18 mass %
- water: 95.66 mass %

Coating Material B
- polyester resin consisting of the following comonomers: terephthalic acid/isophthalic acid/trimellitic acid/sebacic acid/ethylene glycol/neopentyl glycol/1,4-butanediol at a ratio of 28:9:10:3:15:18:17 mol %:6.0 mass %
- melamine crosslinking agent: 0.3 mass %
- colloidal silica particles (average particle diameter: 80 nm): 0.06 mass %
- butyl cellosolve: 1.36 mass %
- water: 92.28 mass %

Example 1

Each polyester resin was dried by a vacuum dryer at 180° C. for 4 hours to remove moisture sufficiently, supplied to a single screw extruder at a constituent ratio given in Table, melted at 280° C., passed through a filter and gear pump to remove impurities and uniformize the extrusion rate, discharged into a sheet-like form from a T-die onto a cooling drum (plated with hard chromium with a maximum height of 0.2 μm) controlled at a temperature of 4° C. to provide an unstretched film. For this step, the distance between the T-die lip and the cooling drum was set to 35 mm, and a wire type electrode with a diameter of 0.1 mm was used to electrostatically charge the sheet by applying static electricity at a voltage of 14 kV to ensure its close contact with the cooling drum. The transit speed of the sheet on the cooling drum was 25 m/min, and the contact length of the sheet with the cooling drum was 2.5 m.

Subsequently, the film temperature was raised using a heating roller prior to stretching in the longitudinal direction, then stretched 3.9 times in the longitudinal direction at a preheat temperature of 60° C. and a stretching temperature of 85° C., and immediately quenching the film using eight cooling rollers (each plated with hard chromium and having a roller diameter of 180 mm, maximum height of 0.2 μm) with a roller surface temperature set at 6° C. In this step, the speed of the film passing on the cooling rollers was 90 m/min, and the contact length of the uniaxially stretched film with the cooling rollers was 4 m. This uniaxially stretched film was subjected to corona discharge treatment in air, and coating material A specified below, which was mixed while being ultrasonically dispersed, was spread uniformly with a #4 metering bar over the treated surface to form an adhesive layer.

Subsequently, using a tenter type transverse stretching machine, the film was preheated in three zones (each with a length of 2,500 mm) with a zone temperature set to 75° C., stretched 3.8 times in the transverse direction in three zones (each with a length of 3,000 mm) with a zone temperature set to 95° C., and relaxed by 2% in the transverse direction in the subsequent one zone (with a length of 3,000 mm). In addition, it was subjected to heat treatment for 5 seconds in five zones (each with a length of 3,000 mm) set to 220° C., and subsequently relaxed by 5% in the transverse direction in three zones (each with a length of 2,500 mm) set to 170° C. to provide a biaxially orientated polyester film with a film thickness of 25 μm.

Example 2

Except for controlling the cooling drum temperature at 7° C., the same procedure as in Example 1 was carried out to provide a biaxially orientated polyester film with a film thickness of 25 μm.

Example 3

Except for controlling the cooling drum temperature at 15° C., the same procedure as in Example 1 was carried out to provide a biaxially orientated polyester film with a film thickness of 25 μm.

Example 4

Except that six cooling rollers (contact length of uniaxially stretched film with cooling rollers was 3 m) were used in the cooling step after stretching in the longitudinal direction, the same procedure as in Example 1 was carried out to provide a biaxially orientated polyester film with a film thickness of 25 μm.

Example 5

Except that four cooling rollers (contact length of uniaxially stretched film with cooling rollers was 2 m) were used in the cooling step after stretching in the longitudinal direction, the same procedure as in Example 1 was carried out to provide a biaxially orientated polyester film with a film thickness of 25 μm.

zones (each with a length of 2,500 mm) set to 170° C., the same procedure as in Example 1 was carried out to provide a biaxially orientated polyester film with a film thickness of 25 μm.

Example 9

Except that in the heat treatment step following the stretching in the transverse direction, heat treatment was performed for 5 seconds in five zones (each with a length of 3,000 mm) set to 200° C. and that subsequently, 2% relaxation in the transverse direction was carried out in three zones (each with a length of 2,500 mm) set to 170° C., the

TABLE 1

| | | | Example 1 | Example 2 | Example 3 | Example 4 | Example 5 |
|---|---|---|---|---|---|---|---|
| Composition | | | polyester A (99 wt %) particle master (1 wt %) | polyester A (99 wt %) particle master (1 wt %) | polyester A (99 wt %) particle master (1 wt %) | polyester A (99 wt %) particle master (1 wt %) | polyester A (99 wt %) particle master (1 wt %) |
| Component | Glycol | | EG (99 mol %) DEG (1 mol %) | EG (99 mol %) DEG (1 mol %) | EG (99 mol %) DEG (1 mol %) | EG (99 mol %) DEG (1 mol %) | EG (99 mol %) DEG (1 mol %) |
| | dicarboxylic acid | | TPA (100 mol %) | TPA (100 mol %) | TPA (100 mol %) | TPA (100 mol %) | TPA (100 mol %) |
| Adhesive with a thickness of (μm) | | | coating material A 25 | coating material A 25 | coating material A 25 | coating material A 25 | coating material A 25 |
| film characteristics | MD | $F10_{MD}$ (MPa) | 143 | 136 | 123 | 135 | 124 |
| | | $F5_{MD}$ (MPa) | 122 | 125 | 118 | 126 | 116 |
| | | $F10_{MD}/F5_{MD}$ | 1.17 | 1.09 | 1.04 | 1.07 | 1.04 |
| | TD | $F10_{TD}$ (MPa) | 145 | 135 | 123 | 135 | 122 |
| | | $F5_{TD}$ (MPa) | 123 | 125 | 119 | 124 | 118 |
| | | $F10_{TD}/F5_{TD}$ | 1.18 | 1.08 | 1.03 | 1.09 | 1.03 |
| | $F10_{MD}/F10_{TD}$ | | 0.99 | 1.01 | 1.00 | 1.00 | 1.02 |
| | degree of heat shrinkage at 200° C. (%) (MD/TD) | | 1.8/0.8 | 1.6/0.7 | 1.4/0.6 | 1.7/0.7 | 1.5/0.7 |
| | dynamic friction coefficient (μd) | | 0.48 | 0.48 | 0.46 | 0.49 | 0.5 |
| Evaluation | film formation property | | ○ | ○ | ○ | ○ | ○ |
| | formability of laminate assembly | | ◎ | ○ | Δ | ○ | Δ |
| | number of pinholes formed in laminate assembly | | 0 | 0 | 3 | 0 | 1 |
| | curling property of laminate assembly | | ◎ | ◎ | ◎ | ◎ | ◎ |

Example 6

Except that preheating was performed in two preheating zones (each with a length of 2,500 mm) in the transverse directional stretching step, the same procedure as in Example 1 was carried out to provide a biaxially orientated polyester film with a film thickness of 25 μm.

Example 7

Except that preheating was performed in two stretching zones (each with a length of 3,000 mm) in the transverse directional stretching step, the same procedure as in Example 1 was carried out to provide a biaxially orientated polyester film with a film thickness of 25 μm.

Example 8

Except that in the heat treatment step following the stretching in the transverse direction, heat treatment was performed for 5 seconds in five zones (each with a length of 3,000 mm) set to 220° C. and that subsequently, 2% relaxation in the transverse direction was carried out in three zones (each with a length of 2,500 mm) set to 170° C., the same procedure as in Example 1 was carried out to provide a biaxially orientated polyester film with a film thickness of 25 μm.

Example 10

Except that after the stretching in the transverse direction, relaxation in the transverse direction was not performed in the subsequent zone (with a length of 3,000 mm), that in the heat treatment step, heat treatment was performed for 5 seconds in five zones (each with a length of 3,000 mm) set to 200° C., and that subsequently, 2% relaxation in the transverse direction was carried out in three zones (each with a length of 2,500 mm) set to 170° C., the same procedure as in Example 1 was carried out to provide a biaxially orientated polyester film with a film thickness of 25 μm. The resulting film was high in degree of heat shrinkage at 200° C., leading to a curled assembly, but it was acceptable in terms of practical characteristics required of a polyester film.

TABLE 2

| | | Example 6 | Example 7 | Example 8 | Example 9 | Example 10 |
|---|---|---|---|---|---|---|
| Composition | | polyester A (99 wt %) particle master (1 wt %) | polyester A (99 wt %) particle master (1 wt %) | polyester A (99 wt %) particle master (1 wt %) | polyester A (99 wt %) particle master (1 wt %) | polyester A (99 wt %) particle master (1 wt %) |
| Component | Glycol | EG (99 mol %) DEG (1 mol %) | EG (99 mol %) DEG (1 mol %) | EG (99 mol %) DEG (1 mol %) | EG (99 mol %) DEG (1 mol %) | EG (99 mol %) DEG (1 mol %) |
| | dicarboxylic acid | TPA (100 mol %) | TPA (100 mol %) | TPA (100 mol %) | TPA (100 mol %) | TPA (100 mol %) |
| Adhesive | | coating material A | coating material A | coating material A | coating material A | coating material A |
| with a thickness of (μm) | | 25 | 25 | 25 | 25 | 25 |
| film characteristics | MD $F10_{MD}$ (MPa) | 135 | 137 | 143 | 145 | 143 |
| | $F5_{MD}$ (MPa) | 127 | 127 | 120 | 121 | 122 |
| | $F10_{MD}/F5_{MD}$ | 1.06 | 1.08 | 1.19 | 1.20 | 1.17 |
| | TD $F10_{TD}$ (MPa) | 133 | 136 | 144 | 144 | 145 |
| | $F5_{TD}$ (MPa) | 126 | 127 | 121 | 122 | 123 |
| | $F10_{TD}/F5_{TD}$ | 1.06 | 1.07 | 1.19 | 1.18 | 1.18 |
| | $F10_{MD}/F10_{TD}$ | 1.02 | 1.01 | 0.99 | 1.01 | 0.99 |
| | degree of heat shrinkage at 200° C. (%) (MD/TD) | 1.6/0.6 | 1.7/0.5 | 3.1/1.8 | 4.7/3.6 | 5.8/5.2 |
| | dynamic friction coefficient (μd) | 0.47 | 0.49 | 0.5 | 0.48 | 0.47 |
| Evaluation | film formation property | ○ | ○ | ○ | ○ | ○ |
| | formability of laminate assembly | ○ | ○ | ◎ | ◎ | ◎ |
| | number of pinholes formed in laminate assembly | 0 | 0 | 0 | 0 | 0 |
| | curling property of laminate assembly | ◎ | ◎ | ○ | Δ | X |

Example 11

Except that the draw ratio in the longitudinal direction was 4.1 while the draw ratio in the transverse direction was 4.2, the same procedure as in Example 1 was carried out to provide a biaxially orientated polyester film with a film thickness of 25 μm.

Example 12

Except that the draw ratio in the longitudinal direction was 3.6 while the draw ratio in the transverse direction was 3.6, the same procedure as in Example 1 was carried out to provide a biaxially orientated polyester film with a film thickness of 25 μm.

Example 13

Except that the draw ratio in the longitudinal direction was 3.5 while the draw ratio in the transverse direction was 3.5, the same procedure as in Example 1 was carried out to provide a biaxially orientated polyester film with a film thickness of 25 μm.

Example 14

Except that the component composition was changed as shown in Table, the same procedure as in Example 1 was carried out to provide a biaxially orientated polyester film with a film thickness of 25 μm.

Example 15

Except that the component composition was changed as shown in Table, the same procedure as in Example 1 was carried out to provide a biaxially orientated polyester film with a film thickness of 25 μm.

TABLE 3

| | | Example 11 | Example 12 | Example 13 | Example 14 | Example 15 |
|---|---|---|---|---|---|---|
| Composition | | polyester A (99 wt %) particle master (1 wt %) | polyester A (99 wt %) particle master (1 wt %) | polyester A (99 wt %) particle master (1 wt %) | polyester A (59 wt %) polyester B (40 wt %) particle master (1 wt %) | polyester A (39 wt %) polyester B (60 wt %) particle master (1 wt %) |
| component | Glycol | EG (99 mol %) DEG (1 mol %) | EG (99 mol %) DEG (1 mol %) | EG (99 mol %) DEG (1 mol %) | EG (99 mol %) DEG (1 mol %) | EG (99 mol %) DEG (1 mol %) |
| | dicarboxylic acid | TPA (100 mol %) | TPA (100 mol %) | TPA (100 mol %) | TPA (94 mol %) IPA (6 mol %) | TPA (96 mol %) IPA (4 mol %) |
| Adhesive | | coating material A | coating material A | coating material A | coating material A | coating material A |
| with a thickness of (μm) | | 25 | 25 | 25 | 25 | 25 |
| film characteristics | MD $F10_{MD}$ (MPa) | 148 | 135 | 120 | 124 | 119 |
| | $F5_{MD}$ (MPa) | 122 | 127 | 118 | 115 | 112 |
| | $F10_{MD}/F5_{MD}$ | 1.21 | 1.06 | 1.02 | 1.08 | 1.04 |
| | TD $F10_{TD}$ (MPa) | 149 | 133 | 121 | 123 | 118 |
| | $F5_{TD}$ (MPa) | 123 | 126 | 119 | 115 | 113 |
| | $F10_{TD}/F5_{TD}$ | 1.21 | 1.06 | 1.02 | 1.07 | 1.03 |
| | $F10_{MD}/F10_{TD}$ | 0.99 | 1.02 | 0.99 | 1.01 | 1.01 |
| | degree of heat shrinkage at 200° C. (%) (MD/TD) | 1.8/0.8 | 1.6/0.7 | 1.4/0.6 | 2.1/1.1 | 2.8/1.6 |
| | dynamic friction coefficient (μd) | 0.48 | 0.48 | 0.46 | 0.49 | 0.48 |

TABLE 3-continued

|  |  | Example 11 | Example 12 | Example 13 | Example 14 | Example 15 |
|---|---|---|---|---|---|---|
| Evaluation | film formation property | Δ | ○ | ○ | ○ | ○ |
|  | formability of laminate assembly | ◎ | ○ | Δ | ○ | Δ |
|  | number of pinholes formed in laminate assembly | 0 | 0 | 5 | 3 | 14 |
|  | curling property of laminate assembly | ◎ | ◎ | ◎ | ◎ | ◎ |

Example 16

Except that the component composition was changed as shown in Table, the same procedure as in Example 1 was carried out to provide a biaxially orientated polyester film with a film thickness of 25 μm. The resulting film had good mechanical characteristics, but it was slightly high in friction coefficient, leading to a slight decrease in forming followability.

Example 17

Except for using coating material B, the same procedure as in Example 1 was carried out to provide a biaxially orientated polyester film with a film thickness of 25 μm.

Example 18

Except that coating with an adhesive layer was not performed after the uniaxial stretching in the longitudinal direction, the same procedure as in Example 1 was carried out to provide a biaxially orientated polyester film with a film thickness of 25 μm. The resulting film had good mechanical characteristics, but suffered from a slight decrease in forming followability because of the absence of an adhesive layer.

Example 19

Except for controlling the cooling drum temperature at 10° C., the same procedure as in Example 1 was carried out to provide a biaxially orientated polyester film with a film thickness of 25 μm.

Example 20

Except that seven cooling rollers (contact length of uniaxially stretched film with cooling rollers was 3.5 m) were used in the cooling step after stretching in the longitudinal direction, the same procedure as in Example 1 was carried out to provide a biaxially orientated polyester film with a film thickness of 25 μm.

TABLE 4

|  |  |  | Example 16 | Example 17 | Example 18 | Example 19 | Example 20 |
|---|---|---|---|---|---|---|---|
| Composition |  |  | polyester A (99.6 wt %) | polyester A (99 wt %) | polyester A (99 wt %) | polyester A (99 wt %) | polyester A (99 wt %) |
|  |  |  | particle master (0.4 wt %) | particle master (1 wt %) | particle master (1 wt %) | particle master (1 wt %) | particle master (1 wt %) |
| component | Glycol |  | EG (99 mol %) | EG (99 mol %) | EG (99 mol %) | EG (99 mol %) | EG (99 mol %) |
|  |  |  | DEG (1 mol %) | DEG (1 mol %) | DEG (1 mol %) | DEG (1 mol %) | DEG (1 mol %) |
|  | dicarboxylic acid |  | TPA (100 mol %) | TPA (100 mol %) | TPA (100 mol %) | TPA (100 mol %) | TPA (100 mol %) |
| Adhesive |  |  | coating material A | coating material B | — | coating material A | coating material A |
| with a thickness of (μm) |  |  | 25 | 25 | 25 | 25 | 25 |
| film characteristics | MD | $F10_{MD}$ (MPa) | 143 | 144 | 140 | 126 | 127 |
|  |  | $F5_{MD}$ (MPa) | 121 | 122 | 121 | 118 | 119 |
|  |  | $F10_{MD}/F5_{MD}$ | 1.18 | 1.18 | 1.16 | 1.07 | 1.07 |
|  | TD | $F10_{TD}$ (MPa) | 145 | 144 | 146 | 127 | 129 |
|  |  | $F5_{TD}$ (MPa) | 124 | 122 | 122 | 119 | 120 |
|  |  | $F10_{TD}/F5_{TD}$ | 1.17 | 1.18 | 1.20 | 1.07 | 1.08 |
|  | $F10_{MD}/F10_{TD}$ |  | 0.99 | 1.00 | 0.96 | 0.99 | 0.98 |
|  | degree of heat shrinkage at 200° C. (%) (MD/TD) |  | 1.9/0.7 | 1.8/0.8 | 2.1/1.1 | 1.6/0.7 | 1.8/0.8 |
|  | dynamic friction coefficient (μd) |  | 0.74 | 0.48 | 0.52 | 0.46 | 0.48 |
| Evaluation | film formation property |  | ○ | ○ | ○ | ○ | ○ |
|  | formability of laminate assembly |  | ○ | ◎ | ○ | ○ | ○ |
|  | number of pinholes formed in laminate assembly |  | 0 | 0 | 0 | 0 | 0 |
|  | curling property of laminate assembly |  | ◎ | ◎ | ◎ | ◎ | ◎ |

Example 21

Except that the cooling drum temperature was controlled at 15° C., that six cooling rollers (contact length of uniaxially stretched film with cooling rollers was 3 m) were used in the cooling step after stretching in the longitudinal direction, and that the draw ratio in the longitudinal direction was 3.5 while the draw ratio in the transverse direction was 3.5, the same procedure as in Example 1 was carried out to provide a biaxially orientated polyester film with a film thickness of 25 μm.

Example 22

Except that the cooling drum temperature was controlled at 15° C., that four cooling rollers (contact length of uniaxially stretched film with cooling rollers was 2 m) were used in the cooling step after stretching in the longitudinal direction, and that the draw ratio in the longitudinal direction was 3.5 while the draw ratio in the transverse direction was 3.7, the same procedure as in Example 1 was carried out to provide a biaxially orientated polyester film with a film thickness of 25 μm.

Example 23

Except that the cooling drum temperature was controlled at 15° C., that four cooling rollers (contact length of uniaxially stretched film with cooling rollers was 2 m) were used in the cooling step after stretching in the longitudinal direction, and that the draw ratio in the longitudinal direction was 3.7 while the draw ratio in the transverse direction was 3.5, the same procedure as in Example 1 was carried out to provide a biaxially orientated polyester film with a film thickness of 25 μm.

Example 24

Except that the film thickness was 19 μm, the same procedure as in Example 1 was carried out to provide a biaxially orientated polyester film.

Example 25

Except that the film thickness was 15 μm, the same procedure as in Example 1 was carried out to provide a biaxially orientated polyester film.

Comparative Example 1

Except that the cooling drum temperature was controlled at 15° C., the static electricity applying voltage at 10 kV, and the temperatures for preheating and stretching in the longitudinal direction at 65° C. and 95° C., respectively, and that the cooling after the stretching was performed by using five cooling rollers (contact length of uniaxially stretched film with cooling rollers was 2.5 m) set to a cooling roller temperature of 15° C., the same procedure as in Example 1 was carried out to provide a biaxially orientated polyester film with a film thickness of 25 μm.

Comparative Example 2

Except that the temperatures for preheating and stretching in the longitudinal direction were controlled at 65° C. and 95° C., respectively, that the cooling after the stretching was performed by using five cooling rollers (contact length of uniaxially stretched film with cooling rollers was 2.5 m) set to a cooling roller temperature of 15° C., and that the temperatures for preheating and stretching in the transverse direction were controlled at 90° C. and 110° C., respectively, the same procedure as in Example 1 was carried out to provide a biaxially orientated polyester film with a film thickness of 25 μm.

Comparative Example 3

Except that in the transverse directional stretching step, preheating was performed on one zone (each with a length of 5,000 mm) set to a zone temperature of 90° C. and that stretching by 3.8 times in the transverse direction was performed in three zones (each with a length of 6,000 mm) set to a zone temperature of 110° C., the same procedure as in Example 1 was carried out to provide a biaxially orientated polyester film with a film thickness of 25 μm.

Comparative Example 4

Except that the draw ratio in the longitudinal direction was 3.4 while the draw ratio in the transverse direction was

TABLE 5

| | | | Example 21 | Example 22 | Example 23 | Example 24 | Example 25 |
|---|---|---|---|---|---|---|---|
| Composition | | | polyester A (99 wt %) particle master (1 wt %) | polyester A (99 wt %) particle master (1 wt %) | polyester A (99 wt %) particle master (1 wt %) | polyester A (99 wt %) particle master (1 wt %) | polyester A (99 wt %) particle master (1 wt %) |
| component | Glycol | | EG (99 mol %) DEG (1 mol %) | EG (99 mol %) DEG (1 mol %) | EG (99 mol %) DEG (1 mol %) | EG (99 mol %) DEG (1 mol %) | EG (99 mol %) DEG (1 mol %) |
| | dicarboxylic acid | | TPA (100 mol %) | TPA (100 mol %) | TPA (100 mol %) | TPA (100 mol %) | TPA (100 mol %) |
| Adhesive | | | coating material A | coating material A | coating material A | coating material A | coating material A |
| with a thickness of (μm) | | | 25 | 25 | 25 | 19 | 15 |
| film charac- teristics | MD | $F10_{MD}$ (MPa) | 117 | 115 | 123 | 141 | 142 |
| | | $F5_{MD}$ (MPa) | 112 | 111 | 117 | 121 | 120 |
| | | $F10_{MD}/F5_{MD}$ | 1.04 | 1.04 | 1.05 | 1.17 | 1.18 |
| | TD | $F10_{TD}$ (MPa) | 116 | 124 | 118 | 141 | 141 |
| | | $F5_{TD}$ (MPa) | 112 | 117 | 115 | 122 | 121 |
| | | $F10_{TD}/F5_{TD}$ | 1.04 | 1.06 | 1.03 | 1.16 | 1.17 |
| | $F10_{MD}/F10_{TD}$ | | 1.01 | 0.93 | 1.04 | 1.00 | 1.01 |
| | degree of heat shrinkage at 200° C. (%) (MD/TD) | | 1.4/0.5 | 1.2/0.8 | 1.7/0.5 | 1.8/0.7 | 1.8/0.8 |
| | dynamic friction coefficient (μd) | | 0.48 | 0.47 | 0.48 | 0.49 | 0.52 |
| Evalu- ation | film formation property | | ○ | ○ | ○ | ○ | ○ |
| | formability of laminate assembly | | Δ | Δ | Δ | ◎ | ◎ |
| | number of pinholes formed in laminate assembly | | 16 | 11 | 10 | 2 | 4 |
| | curling property of laminate assembly | | ◎ | ◎ | ◎ | ◎ | ◎ |

3.4, the same procedure as in Example 1 was carried out to provide a biaxially orientated polyester film with a film thickness of 25 μm.

Comparative Example 5

Except that the draw ratio in the longitudinal direction was 4.3 while the draw ratio in the transverse direction was 4.6, the same procedure as in Example 1 was carried out for film formation, but breakage took place frequently, failing to provide a satisfactory film.

TABLE 6

|  |  |  | Comparative Example 1 | Comparative Example 2 | Comparative Example 3 | Comparative Example 4 | Comparative Example 5 |
|---|---|---|---|---|---|---|---|
| Composition |  |  | polyester A (99 wt %) particle master (1 wt %) | polyester A (99 wt %) particle master (1 wt %) | polyester A (99 wt %) particle master (1 wt %) | polyester A (99 wt %) particle master (1 wt %) | polyester A (99 wt %) particle master (1 wt %) |
| component | Glycol |  | EG (99 mol %) DEG (1 mol %) | EG (99 mol %) DEG (1 mol %) | EG (99 mol %) DEG (1 mol %) | EG (99 mol %) DEG (1 mol %) | EG (99 mol %) DEG (1 mol %) |
|  | dicarboxylic acid |  | TPA (100 mol %) | TPA (100 mol %) | TPA (100 mol %) | TPA (100 mol %) | TPA (100 mol %) |
| Adhesive |  |  | coating material A | coating material A | coating material A | coating material A | coating material A |
| with a thickness of (μm) |  |  | 25 | 25 | 25 | 25 | 25 |
| film charac- teristics | MD | $F10_{MD}$ (MPa) | 119 | 118 | 118 | 115 | — |
|  |  | $F5_{MD}$ (MPa) | 121 | 120 | 120 | 119 | — |
|  |  | $F10_{MD}/F5_{MD}$ | 0.98 | 0.98 | 0.98 | 0.97 | — |
|  | TD | $F10_{TD}$ (MPa) | 118 | 117 | 120 | 114 | — |
|  |  | $F5_{TD}$ (MPa) | 121 | 122 | 121 | 117 | — |
|  |  | $F10_{TD}/F5_{TD}$ | 0.98 | 0.96 | 0.99 | 0.97 | — |
|  | $F10_{MD}/F10_{TD}$ |  | 1.01 | 1.01 | 0.98 | 1.01 | — |
|  | degree of heat shrinkage at 200° C. (%) (MD/TD) |  | 1.6/0.6 | 1.4/0.5 | 1.4/0.5 | 1.2/0.4 | — |
|  | dynamic friction coefficient (μd) |  | 0.47 | 0.48 | 0.48 | 0.47 | — |
| Evaluation | film formation property |  | ○ | ○ | ○ | ○ | X |
|  | formability of laminate assembly |  | X | X | X | X | — |
|  | number of pinholes formed in laminate assembly |  | — | — | — | — | — |
|  | curling property of laminate assembly |  | ◎ | ◎ | ◎ | ◎ | — |

INDUSTRIAL APPLICABILITY

Our polyester film has specific relationships among the stress at 5% elongation (F5 value) and stress at 10% elongation (F10 value) at 25° C. in the longitudinal direction and those in the transverse direction of the film and, accordingly, exhibits high forming followability after being laminated with aluminum foil and suitability to deep drawing, thus serving favorably to produce laminate assemblies for exterior packages of high capacity batteries and medical packaging containers of different shapes.

The invention claimed is:

1. A polyester film having a stress at 5% elongation (F5 value) and a stress at 10% elongation (F10 value) at 25° C. in a longitudinal direction (MD) and those in a transverse direction (TD) that satisfy formulae (I), (II), (III) and (IV):

$$1.5 \geq F10_{MD}/F5_{MD} \geq 1 \quad (I)$$

$$1.5 \geq F10_{TD}/F5_{TD} \geq 1 \quad (II)$$

$$F10_{MD} \geq 120 \text{ MPa} \quad (III)$$

$$F10_{TD} \geq 120 \text{ MPa} \quad (IV),$$

wherein in the polyester film 95 mol % or more of glycol units are structural units derived from ethylene glycol and 95 mol % or more of dicarboxylic acid units are structural units derived from terephthalic acid.

2. The polyester film as defined in claim 1, wherein the stress at 10% elongation at 25° C. in the longitudinal direction and that in the transverse direction satisfy formula (V):

$$1.2 \geq F10_{MD}/F10_{TD} \geq 0.8 \quad (V).$$

3. The polyester film as defined in claim 1, wherein the polyester film has a degree of heat shrinkage at 200° C. is −5 to 5% both in the longitudinal and transverse directions.

4. The polyester film as defined in claim 1, wherein at least either of its surfaces has a dynamic friction coefficient μd of 0.3 to 0.8.

5. A laminate comprising the polyester film as defined in claim 1 laminated to a metal foil.

6. Packaging for batteries comprising the polyester film as defined in claim 1.

7. Medical packaging containers comprising polyester film as defined in claim 1.

8. Laminates comprising polyester film as defined in claim 1, wherein at least either of surfaces is laminated with aluminum foil with a thickness of 10 μm or more and 60 μm or less.

9. Packaging for batteries comprising laminates as defined in claim 8.

10. The polyester film as defined in claim 2, wherein the polyester film has a degree of heat shrinkage at 200° C. is −5 to 5% both in the longitudinal and transverse directions.

11. The polyester film as defined in claim 2, wherein at least either of its surfaces has a dynamic friction coefficient μd of 0.3 to 0.8.

12. A polyester film having a stress at 5% elongation (F5 value) and a stress at 10% elongation (F10 value) at 25° C. in a longitudinal direction (MD) and those in a transverse direction (TD) that satisfy formulae (I), (II), (III) and (IV):

$$1.5 \geq F10_{MD}/F5_{MD} \geq 1 \quad (I)$$

$$1.5 \geq F10_{TD}/F5_{TD} \geq 1 \quad (II)$$

$$F10_{MD} \geq 120 \text{ MPa} \qquad (III)$$

$$F10_{TD} \geq 120 \text{ MPa} \qquad (IV).$$

13. A polyester film having a stress at 5% elongation (F5 value) and a stress at 10% elongation (F10 value) at 25° C. in a longitudinal direction (MD) and those in a transverse direction (TD) that satisfy formulae (I) and (II):

$$1.5 \geq F10_{MD}/F5_{MD} \geq 1 \qquad (I)$$

$$1.5 \geq F10_{TD}/F5_{TD} \geq 1 \qquad (II),$$

wherein the polyester film has a degree of heat shrinkage at 200° C. is −5 to 5% both in the longitudinal and transverse directions.

14. A polyester film having a stress at 5% elongation (F5 value) and a stress at 10% elongation (F10 value) at 25° C. in a longitudinal direction (MD) and those in a transverse direction (TD) that satisfy formulae (I) and (II) given below:

$$1.5 \geq F10_{MD}/F5_{MD} \geq 1 \qquad (I)$$

$$1.5 \geq F10_{TD}/F5_{TD} \geq 1 \qquad (II)$$

wherein in the polyester film 95 mol % or more of glycol units are structural units derived from ethylene glycol and 95 mol % or more of dicarboxylic acid units are structural units derived from terephthalic acid.

* * * * *